3,705,795
PROCESS OF DIRECTLY REDUCING MATERIALS
CONTAINING IRON OXIDE IN A ROTARY KILN
Günter Heitmann, Frankfurt am Main, Germany, assignor
to Metallgesellschaft Aktiengesellschaft, Frankfurt am
Main, Germany
No Drawing. Filed Feb. 5, 1969, Ser. No. 796,905
Claims priority, application Germany, Feb. 9, 1968,
P 15 83 955.1
Int. Cl. C21b 13/08
U.S. Cl. 75—36                         12 Claims

ABSTRACT OF THE DISCLOSURE

A process of producing low-sulfur sponge iron by a direct reduction of materials containing iron oxide in a rotary kiln with the aid of solid carbonaceous reducing agent supplied to the rotary kiln at the discharge end thereof, and with the aid of sulfur-combining solids supplied to the reducing zone of the rotary kiln, characterized in that at least part of the sulfur-combining solid which is required is charged directly into the reducing zone of the rotary kiln and the weight of the charged sulfur-combining substance is at most 4% of the weight of the charged ore and in that the particle size of the sulfur-combining solids is up to 2 mm.

BACKGROUND OF THE INVENTION

This invention relates to a process of producing low-sulfur sponge iron by a direct reduction of materials containing iron oxide in a rotary kiln with the aid of solid carbonaceous reducing agents supplied into the rotary kiln at the dischargre end thereof and sulfur-combining solids supplied directly into the reducing zone of the rotary kiln.

Numerous processes utilizing sponge iron require that the latter has a low sulfur content. To avoid an introduction of sulfur and/or to lower the sulfur content, the charge of the kiln is supplied with sulfur-combining substances, such as alkaline earth metal compounds, e.g., limestone or dolomite. These substances combine with the sulfur. The addition of these sulfur-combining substances reduces the efficiency of the direct reducing process and of the subsequent separation of the matter which is discharged from the kiln. For this reason, the addition of sulfur-combining substances should be as small as possible.

Poor reducing agents such as anthracite and low-temperature coke, which are desulfurized to a high degree or are desulfurized during their outgassing in the rotary kiln in zones which do not contain metallic iron, may be centrally supplied. In this case, at least 2% sulfur-combining substances are added if the sponge iron should contain 0.025% sulfur (Blast Furnace and Steel Plant, 50 (1962), pages 977–989).

If the reducing agent is supplied into the rotary kiln from the discharge end thereof directly into the reducing zone, much larger amounts of sulfur-combining substances will be required because the sulfur is contacted with newly formed iron. So far, the sulfur-combining substances have been used in an amount of 6% of the charged ore and in a particle size of 1–3 millimeters with a minimum amount of undersize particles so as to obtain a sponge iron which contains 0.03–0.06% sulfur ("Stahl und Eisen" 85 (1965), No. 22, page 1376).

The invention

It is an object of the invention to minimize the addition of sulfur-combining substances to a rotary kiln which is supplied with a carbonaceous reducing agent from the discharge end thereof, particularly where rich reducing agents are used, and nevertheless to produce a sponge iron having a low sulfur content and to avoid an interference with the operation of the kiln by the formation of crusts or the like.

According to the invention, this object is accomplished in that at least part, say at least 25%, preferably above 50%, of the sulfur-combining solids which are required are charged directly into the reducing zone of the rotary kiln and the total weight of the charged sulfur-combining substances is at most 4%, preferably 2%, of the weight of the charged ore. The amount of sulfur-combining substances will be at least about 0.5%.

The sulfur-combining substances consist of alkaline earth metal compounds, such as limestone or dolomite.

The reducing zone of the rotary kiln is preferably supplied with all of the sulfur-combining substances. In general the length of the reducing zone is at least 10 meters, for example 12–16 meters, and, desirably, the sulfur-combining substance is distributed over a length of the reducing zone of at least 10 meters.

The sulfur-combining substances may be supplied to the rotary kiln alone or in a mixture with the solid carbonaceous reducing agents.

The sulfur-combining substances are preferably blown into the rotary kiln from the discharge end thereof and are distributed over the surface of the charge in a considerable length portion of the reducing zone. This distribution is controlled by an adjustment of the angle between the injecting device and the kiln axis, an adjustment of the velocity of the entraining gas, and the control of the particle size distribution of the sulfur-combining substance.

A particle size distribution which is highly favorable is defined by a content of at least 80% above 1 millimeter, an upper particle size limit of 2 millimeters and a lower particle size limit above the dust range, preferably at 0.1 millimeter.

Any dust contained in the sulfur-combining substance can be removed by simple separating operations, e.g., by air separation, before the sulfur-combining substance is supplied into the rotary kiln.

The main advantages of the process according to the invention are listed as follows:

A smaller amount of sulfur-combining substances is sufficient for a very good desulfurization of the sponge iron. For instance, a sponge iron having an average sulfur content below 0.02% can be produced if limestone is added in an amount of 2% and in a particle size of 0.1–1 millimeter, even if the coal which is used contains 1% sulfur.

The smaller the particle size of the sulfur-combining substance, the smaller will be the amount of the carbonaceous fraction in the non-magnetic product which has been separated from the matter discharged from the kiln. This fraction must either be discarded or when returned into the rotary kiln must be separated by suitable measures from spent desulfurizing agent and coal ash. Also, the smaller the particle size of the sulfur-combining substance, the lower will be the losses of carbonaceous solids.

Even when rich coal is directly introduced into the reducing zone of the rotary kiln from the discharge end thereof—this practice has recently proved desirable from the technological and economical aspects—the process according to the invention enables the production of sponge iron having low sulfur contents below 0.02% with the aid of smaller amounts of sulfur-combining substances.

Fine-grained sulfur-combining substances may be used without involving trouble in operation.

EXAMPLE 1

A rotary kiln was used which had a length of 12 meters and an inside diameter of 0.8 meter. The rotary kiln was provided with eight shell tubes, which were distributed throughout its length, and the kiln had an injecting device for blowing coal into the kiln at the discharge end thereof.

The ore which was charged was a hematite containing 68% Fe. Specifically, the ore had the following composition in percent by weight:

| | |
|---|---|
| Total Fe | 68.0 |
| $Fe^{2+}$ | 0.4 |
| $SiO_2$ | 1.3 |
| P | 0.03 |
| S | 0.02 |

Pellets which were 8–15 millimeters in diameter were made from the ore, heated to about 1050° C. on a traveling grate and charged at a rate of 12 metric tons per day to the rotary kiln at the charging end thereof.

Coke for recirculation was separated from the discharged matter. This coke contained 0.040% S and was charged to the rotary kiln at the charging end thereof at a rate of 1.2 metric tons per day (basis: 0.815 metric ton $C_{fixed}$/day in recirculation; 68% $C_{fixed}$ in recirculated coke).

5.02 metric tons fresh coal per day (basis: 30% volatiles; 0.28–0.3 metric tons $C_{fixed}$/metric ton Fe in the ore) were blown by the injecting device by means of entraining air into the rotary kiln at the charging end thereof. This fresh coal had a particle size below 6 millimeters and the following composition in percent by weight:

| | |
|---|---|
| $H_2O$ | 2.4 |
| Ash | 19.4 |
| $C_{fixed}$ | 48.9 |
| Volatiles | 29.3 |

Dolomite was added at a rate of 0.36 metric ton per day. 80% of the dolomite had a particle size below 1 millimeter. 90% of the dolomite was blown in with the fresh coal and 10% was introduced with the ore.

The sponge iron which was separated from the matter discharged from the rotary kiln contained less than 0.02% by weight sulfur.

EXAMPLE 2

The operating conditions were the same as in Example 1. The ore contained 0.01% sulfur. Specifically, the ore had the following composition in percent by weight:

| | |
|---|---|
| Total Fe | 68.4 |
| $Fe^{2+}$ | 0.3 |
| S | 0.01 |
| P | 0.03 |
| $SiO_2$ | 1.0 |

The recirculating coke contained 0.03% by weight sulfur.

The fresh coal contained 0.5% by weight sulfur.

Dolomite was added at a rate of 0.24 metric ton per day. The entire amount was blown in a mixture with the fresh coal.

The sponge iron contained less than 0.01% by weight sulfur.

I claim:
1. In a process of producing sponge iron having a low sulfur content by direct reduction of ore containing iron oxide which comprises passing the ore through a rotary kiln, maintaining a reducing zone in the kiln for said reduction at the discharge end of the kiln, introducing carbonaceous reducing agent directly to the reducing zone for the reduction, and introducing sulfur-combining solids directly to the reducing zone, the improvement which comprises introducing sulfur-combining solids into the kiln in amount of 0.5–4% by wt. of the ore, introducing at least 25 wt. percent of the sulfur-combining solids directly to the reducing zone and distributing said 25% on the charge, the particle size of the sulfur-combining solids being up to 2 millimeters.

2. A process according to claim 1, wherein at least 50% of the sulfur-combining solids are charged directly into the reducing zone.

3. A process according to claim 1, wherein the weight of the sulfur-combining substance is at most 2% of the weight of the charged ore.

4. A process according to claim 1, wherein all the sulfur-combining substance is directly supplied into the reducing zone.

5. A process according to claim 1 wherein the sulfur-combining substance is supplied into the rotary kiln admixed with solid carbonaceous reducing agent.

6. A process according to claim 1, wherein the length of the reducing zone is at least 10 meters and the sulfur-combining substance is blown into the rotary kiln from the discharge end thereof and is distributed on the charge throughout at least 10 meters of the length of the reducing zone.

7. A process according to claim 1, wherein at least 80% of the sulfur-combining substances have a particle size below 1 millimeter.

8. A process according to claim 1, wherein the upper particle size limit of the sulfur-combining substances is 2 millimeters.

9. A process according to claim 1, wherein the lower particle size of the sulfur-combining substances is above 0.1 millimeter.

10. A process according to claim 1, wherein rich coal is used as a solid reducing agent and blown into the rotary kiln from the discharge end thereof.

11. A process according to claim 2, wherein the sulfur-combining substance is admixed with solid carbonaceous reducing agent, and the particle size of the sulfur-combining substance is 80%+1 millimeter and 100% plus 0.1 millimeter.

12. Process according to claim 1, wherein the sponge iron has a sulfur content of below 0.02%.

References Cited
UNITED STATES PATENTS

| | | | |
|---|---|---|---|
| 236,561 | 1/1881 | Duryee | 75—33 X |
| 2,500,553 | 3/1950 | Lykken | 75—33 X |
| 2,747,988 | 5/1956 | Von Haken | 75—33 |
| 2,855,290 | 10/1958 | Freeman | 75—33 |
| 3,206,299 | 9/1965 | Senior et al. | 75—34 X |

L. DEWAYNE RUTLEDGE, Primary Examiner

J. M. DAVIS, Assistant Examiner

U.S. Cl. X.R.

75—33